July 29, 1958  K. A. PICKERING  2,845,299
VEHICLE TOP COMPARTMENT COVER MECHANISM
Filed Jan. 20, 1954  3 Sheets-Sheet 1

INVENTOR
Kenneth A. Pickering
BY
ATTORNEY

July 29, 1958  K. A. PICKERING  2,845,299
VEHICLE TOP COMPARTMENT COVER MECHANISM
Filed Jan. 20, 1954  3 Sheets-Sheet 2
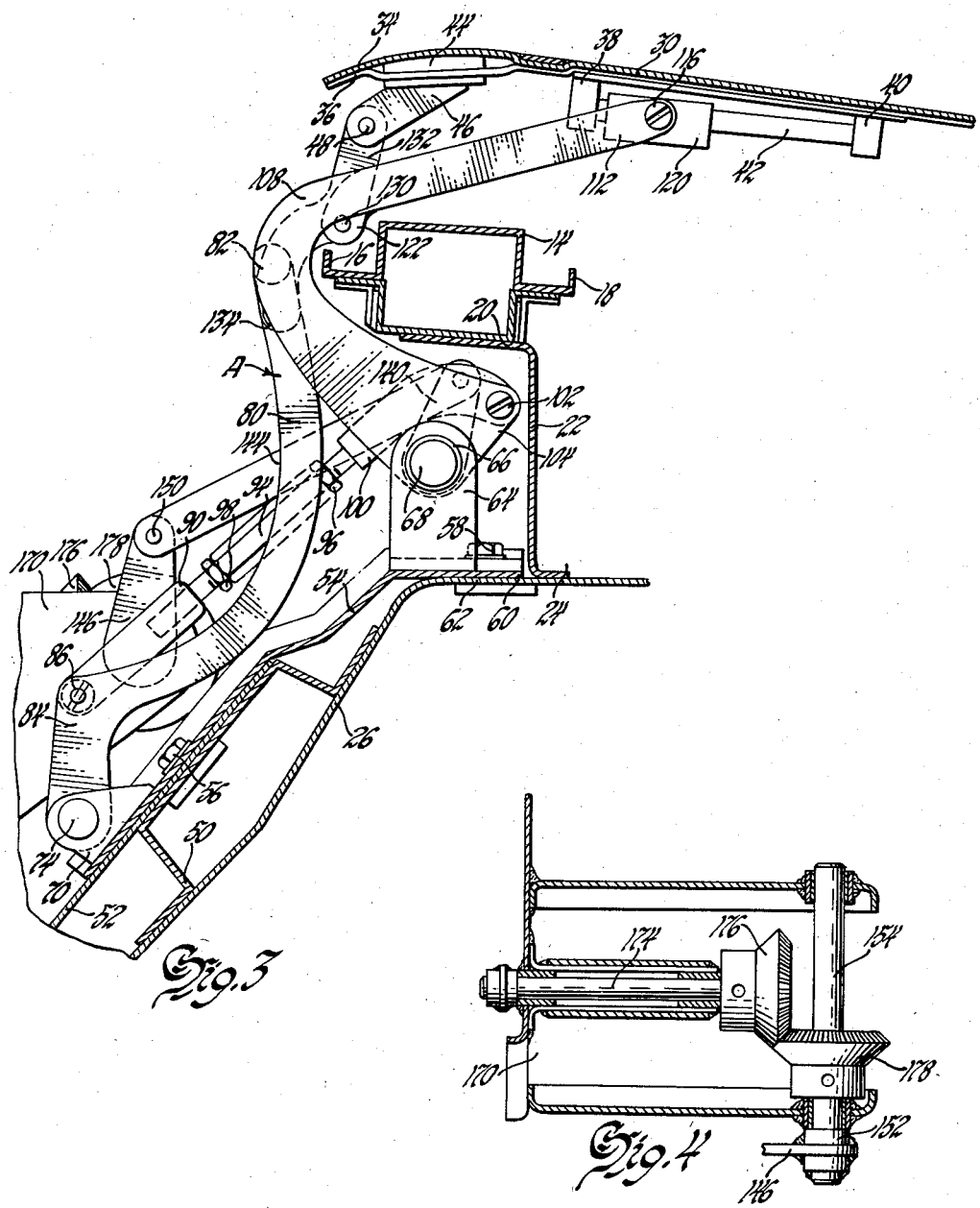
INVENTOR
Kenneth A. Pickering
BY C. H. Sitke
ATTORNEY July 29, 1958  K. A. PICKERING  2,845,299
VEHICLE TOP COMPARTMENT COVER MECHANISM
Filed Jan. 20, 1954  3 Sheets-Sheet 3

INVENTOR
Kenneth A. Pickering
BY
C. H. Dibble
ATTORNEY

United States Patent Office 2,845,299
Patented July 29, 1958

2,845,299

VEHICLE TOP COMPARTMENT COVER MECHANISM

Kenneth A. Pickering, Detroit, Mich., assignor to General Motors Corporation, Detroit, Mich., a corporation of Delaware Application January 20, 1954, Serial No. 405,106

2 Claims. (Cl. 296—136)

This invention relates to cover mechanisms and more particularly to power operated cover mechanisms for vehicles which include covers conveniently moved to or from their operative positions assumed in closing compartments for storage of articles such as vehicle tops.

In modern automotive vehicles of the convertible type numerous expedients have been tried heretofore by means of which a foldable top, when taken down, may be concealed and protected without adversely affecting the appearance of the vehicle. These attempts have met with a number of difficulties. In many cases the contour of the vehicle body has been adversely affected because of the storage cover provision. In other cases the cover operating mechanisms for the tops were not as convenient to operate as would be desirable. Also, placement of the cover during the time intervals essential for raising and lowering of the top has been a bothersome procedure.

It has now been found that a protective cover may smoothly and momentarily be moved to or from its effective shut position during the time interval of raising or lowering the top and that during such displacement the cover may be maintained in such association with the body contour so as not to detract from the appearance of the vehicle.

To these ends, an object of the present invention is to provide an improved cover mechanism including a cover for a compartment comprising suitable power driven linkages for moving the cover edgewise to or from a compartment opening.

Another object is to provide a cover mechanism including a cover for a compartment and which will bodily move the cover edgewise and cause the opposite edges to move in sequence to avoid obstructions.

A feature of the invention resides in a cover for a compartment, a power driven shaft supported in said compartment and linkage systems operatively connecting the shaft with the cover to effect the desired edgewise and sequential motion of the cover into and away from its closed position.

These and other important features of the invention will now be described in detail in the specification and then pointed out more particularly in the appended claims.

In the drawings:

Fig. 3 is a view similar to that of Fig. 2 but with the top compartment cover in its open position, the exterior body structure of the vehicle being omitted;

Fig. 4 is a sectional view taken along the line 4—4 of Fig. 2; and

Figure 1:
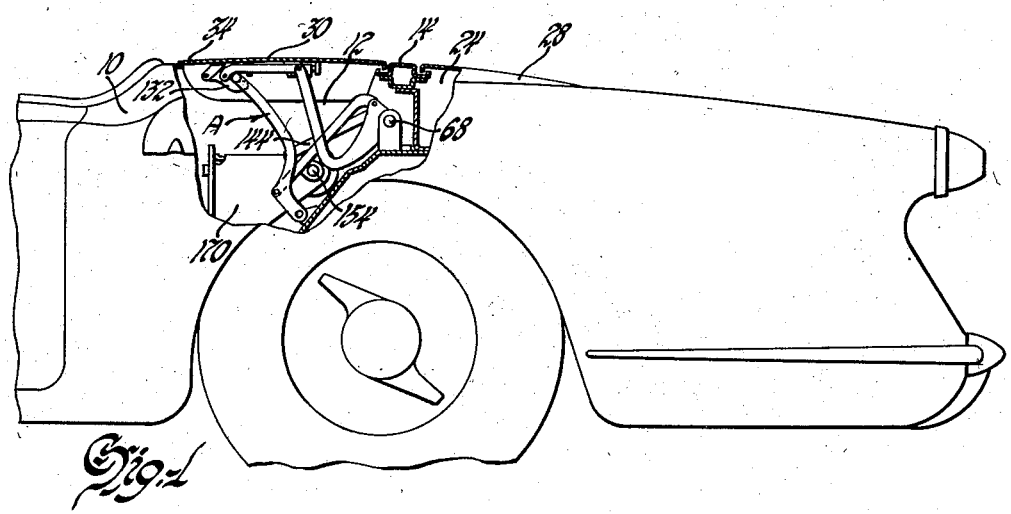
Fig. 1 is a side view of the rear half of an automobile having a top storage compartment cover and linkage embodying the present invention, a portion being broken away for clarity of illustration.

In the drawings the rear half of an automotive vehicle 10 is shown having a top storage compartment 12 and a transverse body structural or frame member 14. The latter is box-like in cross section and is provided with a forward trough 16 and a rearwardly directed trough 18. The member 14 is supported on the top 20 of a vertical stiffening member 22 which passes across the interior of the vehicle body and separates the top compartment 12 from a trunk compartment 24. Incorporated in the body of the vehicle 10 is a sheet metal bottom wall 26 which forms support for the floor of the top compartment 12. A trunk lid 28 is provided and the forward edge thereof is flanged so as to depend downwardly and in alignment with the trough 18.

A cover 30 is adapted to close the top of the compartment 12 and the rearward edge thereof bears a flange 32 which depends downwardly and is adapted to cooperate with the trough 16 to form a weather seal. The forward portion of the cover 30 is curved as at 34 to form a pleasing contour with the vehicle body. Beneath the cover 30 is attached a stiffening plate 36 which extends over the full area of the underside of the cover. This cover may take various forms and is not specifically described herein as such details do not form a part of the present invention.

Near each of the opposite margins of the underside of the cover 30 and at each of opposite sides of the vehicle are mounted two brackets 38 and 40 which serve to support a rod 42 extending lengthwise of the car. The drawings show this arrangement at only the left side of the vehicle. Forwardly of each bracket 38 a bracket 44 is fixed to the cover 30 by means not shown. This bracket bears a forwardly and downwardly extending arm 46 bearing a pivot pin 48.

Figure 5:
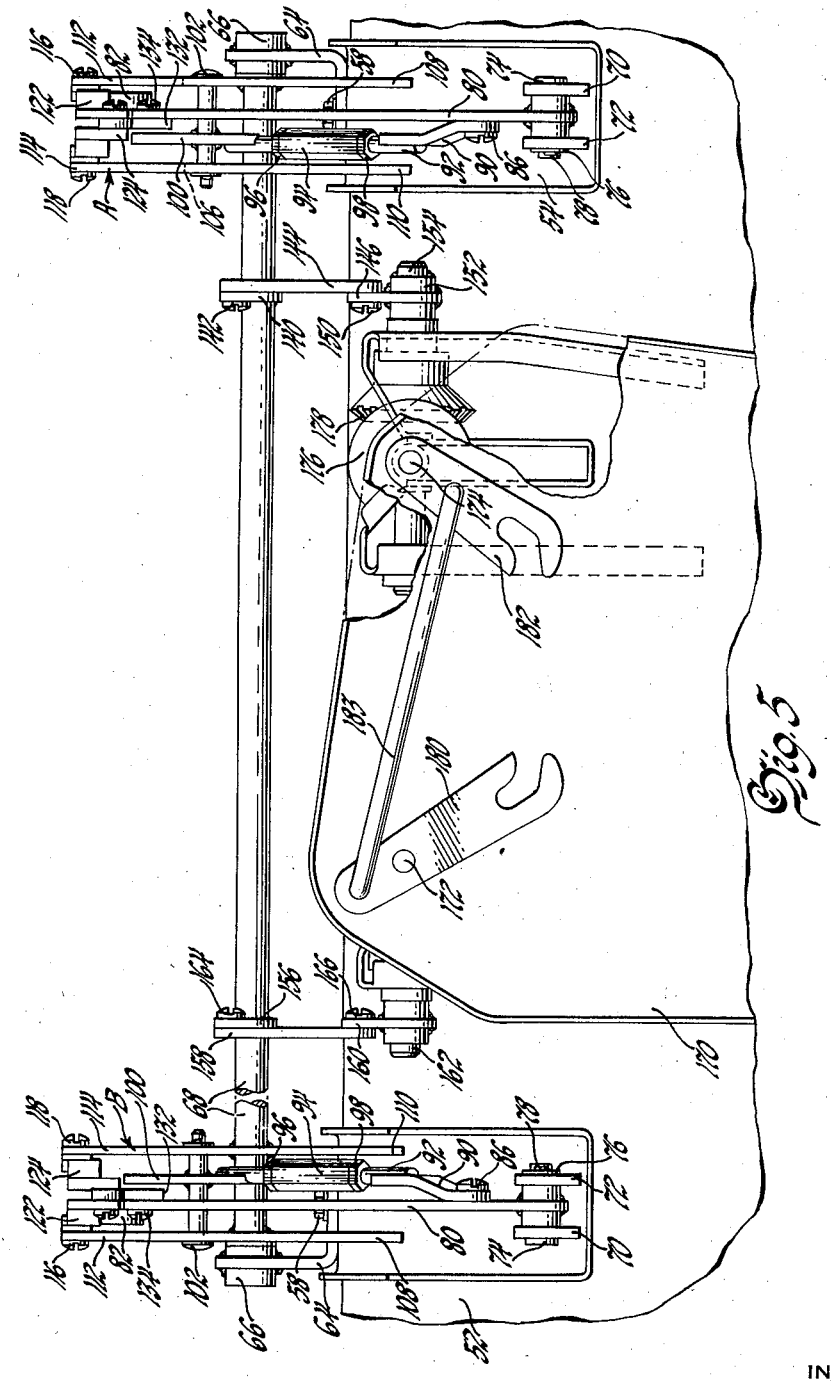
Fig. 5 is an elevational view of the top compartment cover linkages as positioned in Fig. 2 looking towards the rear of the vehicle with the cover and the exterior vehicle body structure omitted.

A channel member 50 is attached to the bottom wall 26 of the top compartment and extends across that compartment partially to support two linkage systems A and B (Fig. 5). The channel member 50 also supports a floor member 52.

As the linkage systems A and B are similar in construction except that they are to the opposite hand, similar reference characters are used for these two systems and the description given below is applicable to either system.

The system A is supported by a flanged plate member 54 which is attached by means of bolts 56 and 58 to the channel member 50 and the wall 26, respectively. One portion 60 of the flanged member is arranged to be supported on a horizontal shelf-like portion 62 of the wall 20 and carries a bracket 64 having a bearing 66 in which one end of a power driven shaft 68 is journaled.

At a lower and downwardly inclined end portion of the flanged plate 54 is located two ears 70 and 72 which support a pivot pin 74. The pin is held in position by means of a washer 76 and a cotter pin 78. Journaled upon the pin 74 is an upwardly extending and curved arm 80 having a stop knob 82 attached to its upper end. A heel portion 84 of the arm 80 is provided with a pivot pin 86 which has an end threaded into the arm. One end of an adjustable link member 90 is pivoted on the pin 86 and this link member comprises an intermediate threaded bar 92 which is made of two portions adjustably joined together by means of a hexagonal sleeve 94 and two co-acting nuts 96 and 98. An upper right angle portion 100 of the link member 90 is pivoted by means of a pin 102 to two upwardly extending portions 104 and 106 of L-shaped levers 108 and 110. Upwardly extending ends 112 and 114 of the levers 108 and 110, respectively, are pivoted by means of pins 116 and 118 to a block 120 which is slidable on the rod 42. Also pivoted on the pin 116 is a link 122 and pivoted on the pin 118 is a link 124.

Figure 2:
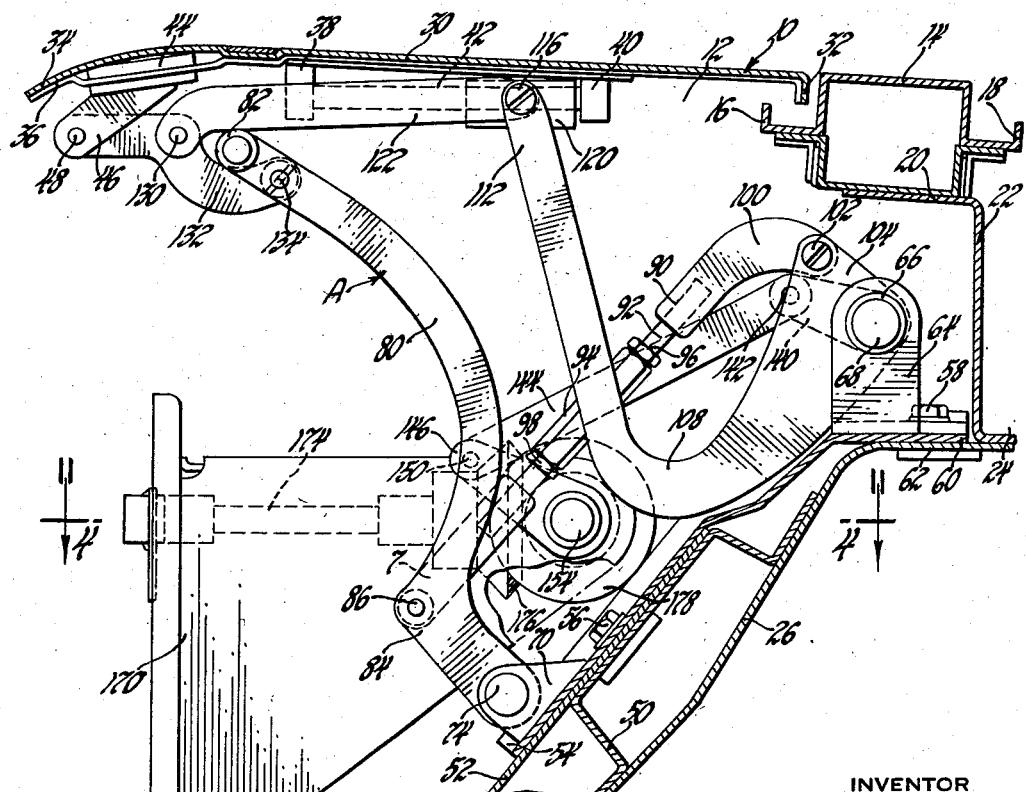
Fig. 2 is an enlarged side elevational view of structures shown in Fig. 1, the top compartment cover being shown in its shut position.

When the cover 30 is in its closed position as in Fig. 2, the links 122 and 124 lie almost horizontally and the forwardly extending ends thereof are pivoted by means of a pin 130 to the midsection of a link 132. One end of the link 132 is pivoted on the pin 48 and the other end is pivoted adjacent to the upper end of the lever 80 by means of a pin 134.

Spaced a slight distance from the linkage system A is an arm 140 which is made integral with the shaft 68 and pivoted by means of a pin 142 to the end of this arm is one end of a link 144. The other end of the link 144 is in pivotal relation with an arm 146 by means of a pin 150 and this arm is provided with a hub 152 rigidly affixed to a shaft 154.

Spaced from the arm 140 and located on the shaft 68 is a second arm 156 (Fig. 5) which is adapted to be rotated by a power shaft 162 through a link 158 and an arm 160 secured to shaft 162. Pivot pins 164 and 166 are provided and serve the same purpose as pivot pins 142 and 150.

Insofar as the present invention is concerned, the power shafts 154 and 162 need only be disclosed as the invention does not relate to the mechanism for turning these shafts. The drawings do show, however, a box-like structure 170 in which two shafts 172 and 174 (Fig. 5) are journaled. The shaft 174 is connected by means of a set of beveled gears 176 and 178 to the shaft 154. The forwardly extending ends of the shafts 172 and 174 have affixed to them levers 180 and 182, respectively, and which are interconnected by means of a rod 183 pivoted to them. As previously stated, this mechanism does not form a part of the present invention but it will be understood that a screw driven member operated by a motor, and not shown, may be caused to move to the right as viewed in Fig. 5 and contact the notched lower end of the lever 182, thereby turning the shafts 154 and 162 in one direction. When the screw-operated member is reversed, it may be caused to contact the lower slotted end of the lever 180 and thereby rotate the shafts 154 and 162 in the other direction. The extent of rotation given to the shaft 68 in either direction is less than 90 degrees. Shaft 172 is provided with a set of bevel gears to act in unison with the gears 176 and 178. This permits the shaft 68 to be lighter in weight and eliminates torsional effects on the shaft and possible twisting of the cover 30.

A suitable power source for actuating the cover mechanism of the present invention is disclosed in an application for United States Letters Patent Serial No. 404,485, entitled Vehicle Folding Top Structure, and filed January 18, 1954, in the names of Frederick C. Walther and John Himka. This application has been abandoned in favor of a continuation-in-part application Serial No. 493,261, filed March 9, 1955, and entitled Vehicle Folding Top.

Regardless of what power source is used, when shafts 154 and 162 are caused to rotate the shaft 68 in a clockwise direction as viewed in Fig. 2, then this motion will cause the levers 108 and 110 of each linkage system to lift the rearwardly extending portion of the cover 30 and begin to move the cover rearwardly from its shut position. As the levers 108 and 110 are linked by means of the links 122 and 124 to the link 132 of each system, the forwardly extending portion of the cover 30 at first simultaneously moves rearwardly and substantially horizontally; that is, with substantially no vertical component of motion. This construction permits the cover 30 to slide out from under the side rails of the top when the latter is in its raised position or folded and ready to be placed into the compartment 12. As the cover 30 continues its rearward motion, the linkage is so articulated as to elevate the rearwardly extending portion of the cover and ultimately to raise and then lower the entire cover into its open position as seen in Fig. 3. It may thus be seen that the cover is caused to move edgewise from its shut position through a reversely curved path to an open position.

After the top has been stowed in the compartment 12 by a mechanism not disclosed herein, the shaft 68 is then rotated in a counterclockwise direction by appropriate mechanism such as the shafts 162 and 154 and the bevel gearing. The cover 30 then retraces the reversely curved path and the forward extending portion of the cover lowers first and slides horizontally into position whereas the rearwardly extending portion subsequently moves downwardly and completes its downward motion to place the cover in its effective shut position. This causes the flange 32 to come in proper weather sealing registry with the trough 16.

It will be appreciated that the cover 30 is placed in its open position only during the raising and lowering cycles of motion for the top. After the top is raised and also during an intermediate stage of lowering the top, the peculiar motion given to the cover in closing permits it to slide under the side rails of the top. A bodily, edgewise and rearward motion of the cover 30 is simultaneously accompanied by the sequential steps which include: lifting of the rear portion of the cover as the forward portion moves horizontally; continuance of lifting of the rear cover portion with simultaneous lifting of the forward portion of the cover; lifting of the forward portion of the cover; and lowering of the entire cover into its open position. Closing of the cover entails a reversal in order of this sequence.

I claim:

1. A cover mechanism for a vehicle top compartment comprising a cover, a horizontal shaft, journal means for supporting said shaft in said compartment, linkage systems spaced along said shaft and arranged to be driven in unison by the latter, each of said linkage systems having supporting means spaced from and below said journal means and spaced connections to said cover, one of said spaced connections being slidable with relation to the said cover, and said spaced connections of each of said systems comprising upwardly extending links with intermediate portions arranged to overlap when said shaft is rotated in one direction thereby reducing the horizontal dimensions of said mechanism at said intermediate portions.

2. A cover mechanism for a vehicle top storage compartment comprising a cover for said compartment which conforms with the vehicle body contour, a horizontal shaft journaled in said compartment and extending a substantial distance along the width of said cover, two parallel linkage systems operatively connected to opposite end portions of said shaft to be driven thereby, each of said systems having spaced pivot connections with said cover, one of said pivot connections being slidable with relation to said cover, the other of said pivot connections including articulated members linked to said slidable pivot connection, and each of said systems comprising upwardly extending links with intermediate portions arranged to overlap when said shaft is rotatively positioned to hold said cover in its open position through operation of said systems.

References Cited in the file of this patent

UNITED STATES PATENTS

| | | |
|---|---|---|
| 1,996,595 | Smith | Apr. 2, 1935 |
| 2,031,526 | Demuth | Feb. 18, 1936 |
| 2,107,993 | Fox | Feb. 8, 1938 |
| 2,122,301 | Soss et al. | June 28, 1938 |
| 2,161,323 | Stephenson | June 6, 1939 |
| 2,173,644 | Blackmore | Sept. 19, 1939 |
| 2,272,230 | Van Voorhees | Feb. 10, 1942 |
| 2,634,455 | Fish | Apr. 14, 1953 |

FOREIGN PATENTS

| | | |
|---|---|---|
| 496,829 | Great Britain | Dec. 7, 1938 |